Patented Mar. 29, 1932

1,851,166

UNITED STATES PATENT OFFICE

JOHN F. KIENNINGER, OF NORTH CAMBRIDGE, MASSACHUSETTS, ASSIGNOR TO TECHNICOLOR MOTION PICTURE CORPORATION, OF BOSTON, MASSACHUSETTS, A CORPORATION OF MAINE

METHOD OF EFFECTING DELAYED HARDENING OF FILMS AND RESULTING PRODUCT

No Drawing. Application filed April 1, 1927. Serial No. 180,339.

This invention relates to a method of obtaining a delayed "hardening" effect, so-called, in colloidal substances such as gelatine (in the form of films and coatings as commonly employed in photography and related arts) and to the resulting product.

It is an object of the invention to arrest or retard the action of hardening agents upon colloidal emulsions or solutions, (as of gelatine and the film or film coatings made therefrom) while in the liquid condition, but to permit such action to proceed upon or during subsequent dehydration and solidification. Other objects will appear from the following disclosure.

The method of the invention includes the steps of incorporating with a colloidal emulsion or solution of gelatine, in water as the dispersing medium, an appropriate hardening agent together with a reagent adapted to activate the hardening reaction thereof and also a restraining agent tending to arrest or retard the activating reagent, at least temporarily, and thereafter to so treat the same as to remove or overcome the effectiveness of the restraining agent, either in whole or in part, and to permit or cause the hardening reaction to proceed accordingly.

The hardening agent is characterized by its property to harden the colloidal emulsion or solution (typically gelatine) under suitable conditions, usually of a reducing nature, and is exemplified generally by the soluble alkali bichromates including ammonium bichromate. Ordinarily potassium bichromate is used for this purpose. The term "hardening" as herein employed is not intended to mean mechanical rigidity but to signify the alteration of the gelatine whereby it is rendered more insoluble in water and the penetration and absorption of dye solution and like coloring agents into the surface or through the outer portion of the gelatine layer is restricted, but without inhibiting the uniform wetting by a dye solution in areas printed therewith and without overcoming the flexibility, uniformity and strength of the film.

The activating reagent is characterized by manifesting a suitable reducing action (usually under positively alkaline or acid conditions) to render the hardening agent effective with respect to its hardening reaction upon the colloidal emulsion or solution. A representative group of such reagents is found in the alkali sulfites (or bisulfites) including ammonium sulfite or bisulfite.

Preferably, such activation of the hardening reaction is substantially prevented while the emulsion or solution is in a liquid condition and effectuated during or after appreciable solidification and/or dehydration of the same has taken place. To this end a restraining agent is employed which is primarily characterized by rendering the activating reagent ineffective with respect to the hardening reaction and by being removable from the emulsion or solution (preferably during or after solidification of the same) without physical disruption or harmful decomposition of the remaining constituents, thereby to permit or cause the hardening reagent to function in the desired manner.

The invention will be described as applied to the hardening of gelatine films, and more especially of films intended for use as blanks for the reception of dye images thereon by imbibition printing.

For this purpose a gelatine emulsion or solution may first be prepared in accordance with usual practices of the art and an appropriate amount of sodium or ammonium bichromate is dissolved therein. The activating reagent, which may be sulfurous acid, a soluble bisulfite or ammonium sulfite is also added in suitable proportions. For example, 5% of sodium bichromate and 5% of ammonium sulfite (upon the weight of gelatine) are suitable amounts for most purposes. The restraining agent is added in sufficient quantity to assure its restraining action being effective, due regard being taken of the nature of the other reagents present. Thus, with 5% ammonium sulfite as the activating agent 5% of concentrated ammonium hydroxide solution is ordinarily sufficient. If ammonium bisulfite is employed, however, more of the ammonium hydroxide will be required.

As thus prepared, the hardening reaction of the gelatine solution or emulsion does not proceed at all or goes on only at an extremely slow rate, so that the hardening effect is not appreciable over long periods of time. The emulsion or solution may now be applied to the usual backing materials, such as celluloid strips, in the customary manner. Upon heating and drying the film, and the consequent stiffening or solidification of the gelatine coating, the restraining agent is gradually expelled and the activating reagent and hardening agent are permitted to become effective to react and harden the solidifying gelatine mass, or to accelerate the hardening reaction of the gelatine. Extensive dehydration or solidification of the gelatine mass, however, appears to slow up or prevent the progress of the hardening reaction. Accordingly, when the moisture content of the mass has been reduced, for example, to 15% or less, subsequent hardening action is again extremely slow, or nil, comparable to the initial liquid solution or emulsion.

The dry gelatine film accordingly is hardened in the course of the solidification or gelatinization of the emulsion or solution, but after treatment and complete solidification, as ordinarily effected, is relatively permanent in this respect. The degree of hardening may be controlled by the mutual reactivities of the reagents employed and by the relative amounts, the fluidity of the whole during treatment and the duration and intensity of the hardening treatment. Heat and the prevalence of positively alkaline or acidic conditions generally accelerate the hardening reaction while the continuance of the alkaline conditions induced by the excess of ammonium hydroxide prevents or greatly retards the hardening so long as its influence predominates, and upon physical solidification (or drying) beyond the gel condition the further progress of the hardening reaction is inhibited.

It is to be understood that the commencement and cessation of the hardening reaction are not accompanied by any positive indications in the reactive mass, but that they may take place both in solutions or emulsions and in the dried film. However, under normal atmospheric conditions and relatively low temperatures, such reaction is extremely slow and hardly detectable or significant in its results, so far as the usual applications of the final products are concerned. But at "room temperature" (70° F.) hardening will ordinarily proceed quite rapidly. Likewise, the finished "hardened" product is relatively permanent with respect to its desired characteristic properties if proper proportions of original materials have been used.

It will be readily appreciated by those skilled in the arts to which it appertains that numerous applications of the invention may be made and that various substitutions and modifications may be resorted to for specific purposes and for the obtainment of different hardening effects, but it is considered that such substitutions and modifications are comprehended by the above disclosure and included by the following claims.

I claim:

1. A method of preparing hardened gelatine films which comprises incorporating with an aqueous emulsion or solution of gelatine a soluble bichromate hardening agent, sulphurous acid and ammonia, and drying.

2. A method of preparing hardened gelatine films which comprises incorporating with an aqueous emulsion or solution of gelatine a soluble bichromate hardening agent, sulphurous acid and ammonia, drying and subsequently controllably removing the ammonia concomitantly with the solidification and hardening of the gelatine.

3. A method of preparing hardened gelatine films which comprises incorporating with an aqueous emulsion or solution of gelatine a soluble alkali metal bichromate hardening agent, a reducing sulphite and ammonia, and subsequently drying and controllably removing the ammonia with concomitant solidification and hardening of the gelatine.

4. A method of preparing hardened gelatine films which comprises incorporating with an aqueous emulsion or solution of gelatine a soluble alkali metal bichromate hardening agent, a reducing alkali metal sulphite and ammonia, and subsequently drying and controllably removing the ammonia with concomitant solidification and hardening of the gelatine.

5. A method of preparing hardened gelatine films which comprises incorporating with an aqueous emulsion or solution of gelatine a soluble alkali metal bichromate hardening agent, a reducing alkali metal bisulphite and ammonia, and subsequently drying and controllably removing the ammonia with concomitant solidification and hardening of the gelatine.

6. A method of preparing hardened gelatine films which comprises incorporating with an aqueous emulsion or solution of gelatine a soluble alkali metal bichromate hardening agent, a reducing ammonium sulphite and ammonia, and subsequently drying and controllably removing the ammonia with concomitant solidification and hardening of the gelatine.

7. A method of preparing hardened gelatine films which comprises incorporating with an aqueous emulsion or solution of gelatine a soluble alkali metal bichromate hardening agent, a reducing ammonium bisulphite and ammonia, and subsequently drying and controllably removing the ammonia with concomitant solidification and hardening of the gelatine.

8. A solidified gelatine emulsion containing a bichromate hardening agent, a reducing sulphite and ammonia, the quantity of the ammonia being sufficient substantially to counteract the activator and removable to permit hardening at an optional time after the emulsion is solidified.

9. A solidified gelatine emulsion containing a bichromate hardening agent, an alkali metal sulphite and ammonia, the quantity of the ammonia being sufficient substantially to counteract the activator and removable to permit hardening at an optional time after the emulsion is solidified.

10. A solidified gelatine emulsion containing a bichromate hardening agent, an alkali metal bisulphate and ammonia, the quantity of the ammonia being sufficient substantially to counteract the activator and removable to permit hardening at an optional time after the emulsion is solidified.

11. A solidified gelatine emulsion containing a bichromate hardening agent, ammonium sulphite and ammonia, the quantity of the ammonia being sufficient substantially to counteract the activator and removable to permit hardening at an optional time after the emulsion is solidified.

12. A solidified gelatine emulsion containing a bichromate hardening agent, ammonium bisulphite and ammonia, the quantity of the ammonia being sufficient substantially to counteract the activator and removable to permit hardening at an optional time after th emulsion is solidified.

Signed by me at Boston, Massachusetts, this twenty-sixth day of March, 1927.

JOHN F. KIENNINGER.